BISECTED DIODE LOADED LINE PHASE SHIFTER

Filed May 2, 1967

INVENTOR

TOM M. HYLTIN
WILLIAM F. HOFFMAN
JAMES E. AUSTIN

E. Mickey Hubbard

ATTORNEY

United States Patent Office 3,454,906

Patented July 8, 1969

3,454,906

BISECTED DIODE LOADED LINE PHASE SHIFTER

Tom M. Hyltin, Dallas, William F. Hoffman, Garland, and James E. Austin, Richardson, Tex., assignors to Texas Instruments Incorporated, Dallas, Tex., a corporation of Delaware Filed May 2, 1967, Ser. No. 635,536
Int. Cl. H01p *3/08*; H03h *7/30*
U.S. Cl. 333—31 11 Claims

ABSTRACT OF THE DISCLOSURE

A reflective mode, three-bit binary phase shift network for microwave frequencies including a microstrip transmission line having a length of approximately $3\lambda/8$ with an input-output end and a reflective end. A 45° bit is provided by $\lambda/8$ section adjacent the reflective end and a single diode controlled reactance shunt circuit $\lambda/8$ from the reflective end. A 90° bit is provided by a standard $\lambda/4$ diode loaded 45° phase shift bit, and a 180° bit is provided by a diode controlled shunt circuit for selectively shorting the reflective end to ground. As a result of the reflective end, the circuit components are used twice, thus achieving 315° phase shift with only a $3\lambda/8$ section of transmission line.

This invention relates generally to microwave phase shifting circuits, and more particularly to a reflection type phase shifter which can be fabricated in microminiaturized monolithc or hybrid form.

One type of phase shift network heretofore used is commonly referred to as the diode loaded-line phase shifter. In this type of phase shifter, a pair of identical shunt circuits are connected to the ends of a quarter wavelength section of transmission line. Each of the shunt circuits includes a diode and an inductor connected in series. When the diode is forward biased "on," the diode is merely a resistance in series with an inductor, and the series circuit appears as a shunt inductive reactance to a transmission line. This results in a phase angle at the end of the quarter wavelength section of transmission line that is less than the 90° phase angle that would exist at the end of an unloaded quarter wavelength section. On the other hand, when the diode is reverse biased "off," the shunt circuit appears as a shunt capacitive reactance due to the capacitance of the diode in the reverse biased condition. As a result, the phase angle of the signal at the end of the quarter wavelength section of the transmission line is some value greater than 90°. The angle between the phase angle when the diode is turned "on" and the phase angle when the diode is turned "off" is therefore the phase shift angle produced by the phase shift "bit." The second shunt circuit is provided at the end of the quarter wavelength section of transmission line to reduce the insertion loss by minimizing the voltage standing wave ratio.

The quarter wavelength section of transmission line, together with the series shunt circuits connected at the input and output ends of the transmission line, produces only one phase shift value or one "bit" value. In order to produce a phase shift network having a number of phase shift values, using the above scheme, a corresponding number of quarter wavelength sections of the transmission line was heretofore required. This represents a serious limitation to the microminiaturization of phase shift networks, particularly when a number of phase shift networks each having a number of phase shift values are needed in the circuit.

In copending U.S. application Ser. No. 606,417, entitled "Diode Loaded Line Phase Shifter," filed on Dec. 30, 1966 on behalf of Tom M. Hyltin et al. and assigned to the assignee of this invention, a phase shift network is described and claimed which utilizes a single quarter wavelength section of transmission line in such a way as to achieve a number of phase shift bits.

The phase shift bits of either type can be connected in series to provide the desired phase shift, but at the expense of space. Also, these phase shift networks are all feed through networks and are not always readily adaptable to reflective applications.

In accordance with this invention, a transmission line having a length of approximately one-eighth wavelength has an input-output end and a reflective end. A shunt network RF couples the input-output end to ground. The shunt network includes a diode and reactance means connected such that when the diode is switched "on," the shunt network has one reactance value, and when the diode is switched "off," the shunt network has another reactance value.

In accordance with another aspect of this invention, a second shunt network is connected to the reflective end of the one-eighth wavelength section of transmission line which includes a diode for substantially RF shorting the reflective end to ground when the diode is switched "on" and maintaining a substantially open circuit to RF frequencies when the diode is switched "off."

In accordance with another aspect of the invention, a quarter wavelength section of transmission line extends from the input-output end and has a pair of shunt networks RF coupling the ends of the quarter wavelength transmission line to ground. Each shunt network includes a diode and reactance means connected such that when the diodes are switched "on," the shunt networks have first substantially equal reactance values, and when the diodes are switched "off," the shunt networks have second substantially equal reactance values.

The invention also contemplates various combinations of the three phase shift bits described above, a binary phase shift network for producing 360° phase shift in 45° increments, and such a phase shift network in monolithic form, as will be particularly pointed out in the appended claims.

A more complete description of the invention and its advantages will be apparent from the specification and claims and from the accompanying drawings wherein:

Figure 1:
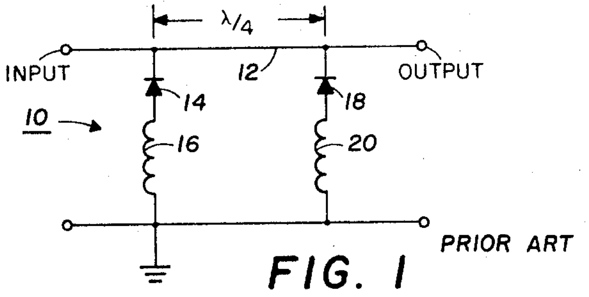
FIG. 1 PRIOR ART
FIGURE 1 is a schematic circuit diagram of a conventional diode loaded, quarter wavelength section phase shift network.

Referring now to FIGURE 1, a conventional diode loaded-line phase shift bit is indicated generally by the reference numeral 10. The phase shift bit 10 includes a quarter wavelength section 12 of a transmission line. A first shunt network comprised of a diode 14 and an inductor 16 is connected between the input end of the quarter wavelength section 12 and ground, and in identical shunt network comprised of a diode 18 and in inductor 20 is connected between the output end of the quarter wavelength section and ground. When the diodes 14 and 18 are turned "on," they act as resistors in series with the inductors 16 and 20. In this condition, the series shunt network at the input of the quarter wavelength section 12 has an inductive reactance which causes the phase angle of a signal appearing at the output end of the transmission line to have a phase lag less than the normal 90° which would result at the output end of the quarter wavelength section. On the other hand, when the diodes 14 and 18 are reversed biased "off," the diodes appear as capacitors in series with the inductors and the shunt networks have a capacitive reactance. As a result of the capacitive reactance of the first shunt network, the phase angle of the signal at the output end of the quarter wavelength section 12 lags more than the normal 90° behind the phase of the signal at the input end. Thus, when the diodes 14 and 18 are turned "off" the phase lag of a signal appearing at the output end of the quarter wavelength section 12 is greater than the phase lag of the same signal when the diodes are turned "on," and the difference in phase lag is the phase shift value of the bit 10. The difference in the phase lag under the two conditions is determined primarily by the shunt network at the input end of the quarter wavelength section and specifically by the addition of the capacitance value of the diode 14 when reverse biased. The series shunt circuit connected at the output end of the quarter wavelength section 12 is provided merely to reduce the insertion loss by minimizing the voltage standing wave ratio.

Figure 2:
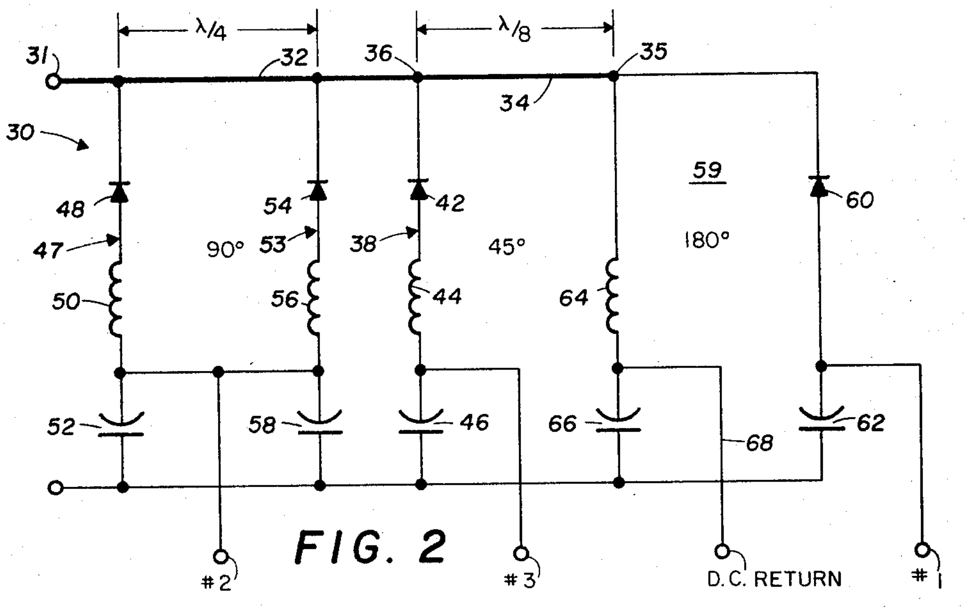
FIGURE 2 is a schematic circuit diagram of a phase shift network in accordance with the present invention.

A three-bit digital phase shifter in accordance with this invention is indicated generally by the reference numeral 30 in the schematic circuit diagram of FIGURE 2. The phase shifter 30 is comprised of a transmission line having an input-output end 31, a quarter wavelength section 32, and an eighth wavelength section 34, and a reflective end 35. The eighth wavelength section 34 may be considered as having an input-output end 36.

A 45° phase shift bit is formed by the eighth wavelength section 34 and a first shunt network 38 which RF couples the input-output end 36 to ground. The first shunt network 38 is comprised of a diode 42, an inductance 44, and a bypass capacitor 46. It should be noted that the eighth wavelength section 34 and the shunt network 38 are identical to one-half of the conventional diode loaded quarter wavelength phase shift bit illustrated in FIGURE 1, since the bypass capacitor merely provides a means for selectively forward biasing diode 42 "on." The values of the diode 42 and the inductance 44 are selected in the same manner that the values of the diode 14 and inductance 16 of the phase shift bit 10, if bit 10 were to produce a 45° phase shift, a procedure which is known in the art.

A 90° phase shift bit is formed by shunt networks 47 and 53 which RF couple the opposite ends of the quarter wavelength section 32 to ground. Shunt network 47 is comprised of diode 48, inductance 50 and capacitor 52, and shunt network 53 is comprised of diode 54, inductance 56 and capacitor 58. The 90° phase shift bit is therefore a convention 45° diode loaded quarter wavelength section phase shifter as illustrated in FIGURE 1, since the capacitors 52 and 58 are provided so that the diodes 48 and 54 can be selectively forward biased. It will be noted that the three shunt networks 38, 47 and 53 may be identical since all are related to a 45° phase shift.

A 180° bit is formed by a shunt network 59 which RF couples the reflective end 35 of the eighth wavelength section 34 to ground. The shunt network 59 is comprised of a first parallel branch including a diode 60 and bypass capacitor 62 and a second parallel branch comprised of inductance 64 and bypass capacitor 66. The diode 60 and the values of the inductance 64 are selected so that when diode 60 is reverse biased "off," the shunt network 59 appears as an RF open circuit at the reflective end 35, and when diode 60 is forward biased "on," the shunt network shorts RF frequencies to ground.

Diode 60 can be forward biased to turn the 180° bit "on" by making logic input #1 more positive than D.C. return terminal 68. Current will then flow through diode 60 and return through inductance 64. Diode 60 can be reverse biased by making logic input #1 more negative than D.C. return 68. Thus, using conventional logic terminology, if logic input #1 is at a logic "1" level, diode 60 is turned "on" and the 180° bit is switched "in,"

and if logic input #1 is at a logic "0" level, the 180° bit is switched "out." Similarly, the 90° bit may be switched "in" by raising logic input #2 from a logic "0" level to a logic "1" level, and the 45° bit may be switched "in" by raising logic input #3 from a logic "0" level to a logic "1" level.

OPERATION

Assume that all inputs are of a logic "0" level so that all four diodes are reversed biased "off." Microwave energy applied at input-output 31 will then propagate down the transmission line to the reflective end 35 and be reflected in phase because diode 60 is reverse biased "off," which essentially results in an open circuit at the reflective end 35. As a result, the reflected signal will lag the injected signal by approximately 270° as a result of the length of the transmission line, less about 67.5° as a result of the inductive reactance of shunt networks 38, 47 and 53. This phase lag of about 202.5° is the zero phase shift condition.

A 180° phase shift can be produced by raising logic input #1 to a logic "1" level so as to forward bias diode 60 "on." The shunt network 59 then acts essentially as an RF short circuit to ground, so that the phase of RF energy reflected from end 35 will be 180° out of phase with the injected energy.

A 90° phase shift can be produced by raising logic input #2 to a logic "1" level so as to forward bias diodes 48 and 54 "on." The microwave energy applied to input-output 31 will be delayed an additional 45° as it travels to the reflective end 35 because of the change in the nature of the shunt network 47 from inductive to capacitive, and another 45° as it returns from the reflective end 35 to the input-output 31 because of the same change in reactance of shunt network 53. Shunt network 53 minimizes the voltage standing wave ratio as energy propagates from the input-output end 31 to the reflective end 35, and similarly, shunt network 47 minimizes the voltage standing wave ratio as the energy returns from the reflective end to the input-output end 31. Thus, the 90° bit acts like a conventional 45° bit to shift the phase of both the inserted energy and the reflected energy 45°, giving a total phase shift of 90°.

The 45° bit may be switched "in" by raising logic input #3 to a logic "1" level so as to forward bias diode 42. Then energy propagating from the input-output end 31 will be shifted 45° by the shunt network 38, and the shunt network 38 will act to minimize the voltage standing wave ratio as the energy is reflected from reflective end 35. Thus, the single shunt network 38 plus the one-eighth wavelength section of transmission line 34 is the equivalent of the conventional quarter wavelength section loaded by identical shunt networks at each end.

By operating the phase shift network 30 in a binary fashion, any phase shift between 0° and 360° can be obtained in 45° increments, as illustrated in the following table:

| Phase shift (deg.) | 180° logic input #1 | 90° logic input #2 | 45° logic input #3 |
|---|---|---|---|
| 0 | 0 | 0 | 0 |
| 45 | 0 | 0 | 0 |
| 90 | 0 | 1 | 1 |
| 135 | 0 | 1 | 1 |
| 180 | 1 | 0 | 0 |
| 225 | 1 | 2 | 1 |
| 270 | 1 | 0 | 10 |
| 315 | 1 | 1 | 1 |
| 360 | 0 | 0 | 0 |

Figure 3:
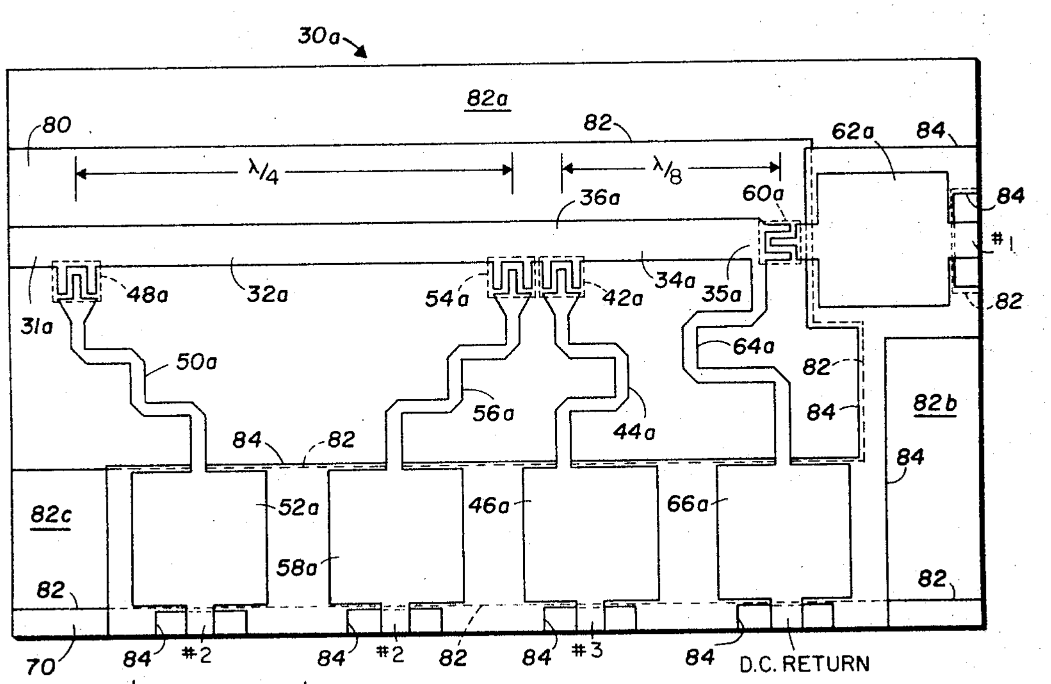
FIGURE 3 is a plan view of the circuit shown in FIGURE 2 in monolithic form.

The entire circuit 30 of FIGURE 2 is implemented in monolithic form in FIGURE 3 where corresponding components are designated by the same reference numerals followed by the character *a*. The circuit 30*a* is formed on a semiconductor substrate 80 having a very high resistivity such as, for example, a p-type silicon having a resistivity greater than 1500 ohm-centimeters. Although p-type silicon is preferred, gallium arsenide or any other suitable high resistivity semiconductor material may be used for the substrate. Planar PIN diodes 48*a*, 54*a*, 42*a* and 60*a* are formed in the surface of the substrate 80 using known diffusion processes. The diodes are then coated with a protective layer, such as silicon dioxide, and a first metal layer 82 deposited and patterned as shown. Next, an insulating layer 84, such as silicon dioxide or tantalum oxide is formed over the first metal layer 82 in the area shown. To insure that a direct short will not later be formed with the metallized layer 82, it will be noted that the insulating layer 84 extends beyond the first metal layer at any point where a second metal layer is to cross the edge of the first metal layer. The protective coating is then removed from over the diodes and a second metal layer deposited over the substrate and patterned to leave the various components of the circuit 30*a* formed by microstrip transmission lines. The back side of the substrate is coated with an insulating layer, such as silicon dioxide and a metal ground plane.

Thus, the transmission line sections 32*a* and 34*a*, the inductances 50*a*, 56*a*, 44*a*, and 64*a*, and top plates of capacitors 52*a*, 58*a*, 46*a*, 66*a*, and 62*a* are formed by the second metal layer. The insulating layer 84 forms the dielectric for the capacitors, and the first metal layer 82 forms the bottom plate for all of the capacitors. The insulating layer 84 is patterned to expose the first metal layer in areas 82*a*, 82*b* and 82*c* to provide bonding tabs for the ground plane connection. Both the insulating layer 84 and the first metal layer 82 are removed so that the logic inputs #1, #2, and #3 and the D.C. return are disposed directly on the surface of the substrate. The diodes 48*a*, 54*a*, 42*a*, and 60*a* are shown with their cathodes connected to the microstrip transmission line sections 32*a* and 34*a*. However, the orientation of the diodes may be reversed without changing the RF operation of the network in any way.

The properties of microstrip transmission lines using semiconductor dielectrics are reported in "Microstrip Transmission on Semiconductor Dielectrics" by T. M. Hyltin, I.E.E.E. Transactions on Microwave Theory and Techniques, vol. MTT–13, page 777, November 1965. The characteristic impedance of such a transmission line is determined by the ratio of the width of the microstrip transmission line to the thickness of the silicon dielectric, which is essentially the spacing between the microstrip line and the ground plane.

To achieve a microstrip transmission line 32*a* of fifty ohm characteristic impedance, the ratio is 0.6, so that when using a ten mil thick silicon substrate, the microstrip transmission line is six mils wide. The inductors 64*a*, 44*a*, 50*a*, and 56*a* on a ten mil thick silicon substrate are two mils wide and have a characteristic impedance of seventy ohms. For a three-bit Ku-band phase shifter, the inductors 44*a*, 50*a* and 56*a* are 44.5 mils long and have a 1.27 nh. inductance. The inductor 64*a* is 54.1 mils long and has a 2.55 nh. inductance.

The thin film bypass capacitors 52*a*, 58*a*, 46*a*, 66*a*, and 62*a* are designed to provide an RF short to ground. The dielectric may be silicon dioxide or tantalum oxide. With the silicon dioxide layer having a thickness of approximately 4000 angstroms, a capacitance of 0.07 picofarad per square mil is obtained. With a tantalum oxide dielectric, also approximately 4000 angstroms thick, a capacitance of 0.8 to 1.0 picofarad per square mil is obtained. For the silicon dielectric type, the total area per capacitor is 400 sq. mils, thus providing 0.3 ohm reactance per capacitor at Ku-band.

The entire circuit of FIGURE 2 may also be fabricated in hybrid form. As such, the substrate 80 would be of high dielectric material, as ceramic, the P-I-N diodes 48, 54, 42, and 60 would then be individually mounted on the substrate 80 with the capacitors, and inductors formed as individual components and mounted on the substrate in the desired locations so interconnected as to provide the desired circuit arrangement of FIGURE 2.

Although various embodiments have been described in detail, it is to be understood that various changes, substitutions and alterations can be made therein without departing from the spirit and scope of the invention as defined in the appended claims.

What is claimed is:

1. In a phase shift network, the combination of:
a transmission line having a length of approximately one-eighth wavelength with an input-output end and a reflective end, and
a shunt network RF coupling the input-output end to ground, said shunt network including a diode and reactance means connected such that when the diode is switched "on," the shunt network has one reactance value, and when the diode is switched "off," the shunt network has another reactance value.

2. The combination defined in claim 1 further characterized by:
a second shunt network connected to the reflective end and including a diode for substantially RF shorting the reflective end to ground when the diode is switched "on," and for maintaining a substantially open circuit to RF frequencies when the diode is switched "off."

3. The combination defined in claim 1 further characterized by:
a transmission line having a length of approximately one quarter wavelength connected to said input-output end, and
a pair of shunt networks RF coupling the opposite ends of the quarter wavelength transmission line to ground, each shunt network including a diode and reactance means connected such that when the diodes are switched "on," the shunt networks have first substantially equal reactance values, and when the diodes are switched "off," the shunt networks have second substantially equal reactance values.

4. The combination defined in claim 2 wherein:
the second shunt network includes an inductance connected to the reflective end which provides a common D.C. return for D.C. bias selectively applied to the diodes of the shunt networks.

5. The combination defined in claim 2 wherein:
the shunt network RF coupling the input-output end to ground comprises the diode and the inductance connected in series and a first bypass capacitor RF coupling the series circuit to ground, and
the second shunt circuit comprises the diode and an inductance connected in parallel, and a second bypass capacitor RF coupling the diode to ground,
whereby the diodes may be selectively biased by applying a D.C. potential at the respective bypass capacitor and using the inductance of the second shunt circuit as the D.C. return.

6. In a phase shift network, the combination of:
a transmission line having a quarter wavelength section and an eighth wavelength section in series, the end of the eighth wavelength section being open circuited to provide a reflective end, and the other end of the transmission line being the input-output end,
a first shunt network RF coupling to the other end of the eighth wavelength section to ground, the first shunt network including a diode and reactance means connected such that when the diode is switched "on," the shunt network has one reactance value, and when the diode is switched "off," the shunt network has another reactance value, and
second and third shunt network RF coupling the ends of the quarter wavelength section to ground, each of the second and third shunt networks including a diode and a reactance means connected such that when the diodes are switched "on," the shunt networks have first substantially equal reactance values, and when the diodes are switches "off," the shunt networks have second substantially equal reactance values.

7. The combination defined in claim 6 further characterized by:

a fourth shunt network RF coupling the reflective end to ground including a diode for substantially RF shorting the reflective end to ground when switched "on," and for maintaining a substantially open circuit to RF frequencies when the diode is switched "off."

8. The combination defined in claim 7 wherein:

the diode and the inductance of each of the first, second and third shunt networks are connected to series and are RF coupled to ground by first, second and third bypass capacitors, respectively, the fourth shunt network is comprised of a diode and an inductance connected in parallel, the diode being RF coupled to ground by a fourth bypass capacitor, and first, second, third and fourth D.C. logic inputs connected to the shunt circuits at the first, second, third and fourth bypass capacitors, respectively, for selectively biasing the diodes, the inductor of the fourth shunt network serving as a common D.C. return for the D.C. logic input terminals.

9. The combination defined in claim 6 wherein the first, second and third shunt networks are substantially identical.

10. The combination defined in claim 9 wherein:

the first shunt network and the eighth wavelength section form a 45° phase shift bit, the second and third shunt networks and the quarter wavelength section form a 90° phase shift bit, and the fourth shunt network forms a 180° phase shift bit.

11. The combination defined in claim 10 wherein:

the components are formed on a high resistivity semiconductor substrate, the diodes being formed in the semiconductor substrate and the transmission lines, inductors, capacitors and conductors being formed by thin films on the substrate.

References Cited

UNITED STATES PATENTS 3,038,086 6/1962 Sterzer.

OTHER REFERENCES

Microwaves, December 162, p. 53 relied on.

HERMAN KARL SAALBACH, *Primary Examiner.*

P. L. GENSLER, *Assistant Examiner.*

U.S. Cl. X.R.

307—298; 317—101, 235; 333—84